Feb. 22, 1949.  R. G. LE TOURNEAU  2,462,516
INDUCTION MOTOR ROTOR
Filed Jan. 17, 1947  2 Sheets-Sheet 1

INVENTOR
R. G. LeTourneau
BY
ATTORNEYS

Patented Feb. 22, 1949

2,462,516

UNITED STATES PATENT OFFICE 2,462,516

INDUCTION MOTOR ROTOR

Robert G. Le Tourneau, Longview, Tex., assignor to R. G. Le Tourneau, Inc., Stockton, Calif., a corporation Application January 17, 1947, Serial No. 722,729

9 Claims. (Cl. 172—120)

1

This invention relates in general to improvements in alternating current induction motors.

In particular the invention has for an object the provision of a novel rotor unit, of squirrel cage type, for an A. C. induction motor; the invention dealing in the main with the means by which the heat from the current induced in the conductor bars of the rotor is effectively dissipated.

A further object of the invention is to provide an induction rotor, as in the preceding paragraph, wherein the heat dissipating means comprises an exposed resistance blade assembly, of unique construction, formed as an extension of the conductor bars; said assembly having a configuration such that it acts both as a resistance and a fan to facilitate the dissipation of the heat.

It is also an object to construct the exposed resistance blade assembly so that the same can withstand the centrifugal force imposed thereon, when the motor is in operation.

Another object of the invention is to provide a rotor unit adapted for use in a high torque motor, and capable of being run at far below synchronous speed without overheating beyond permissible range.

A further object of the invention is to provide a practical rotor unit, and one which will be exceedingly effective for the purpose for which it is designed.

These objects are accomplished by means of such structure and relative arrangement of parts as will fully appear by a perusal of the following specification and claims.

Figure 1:
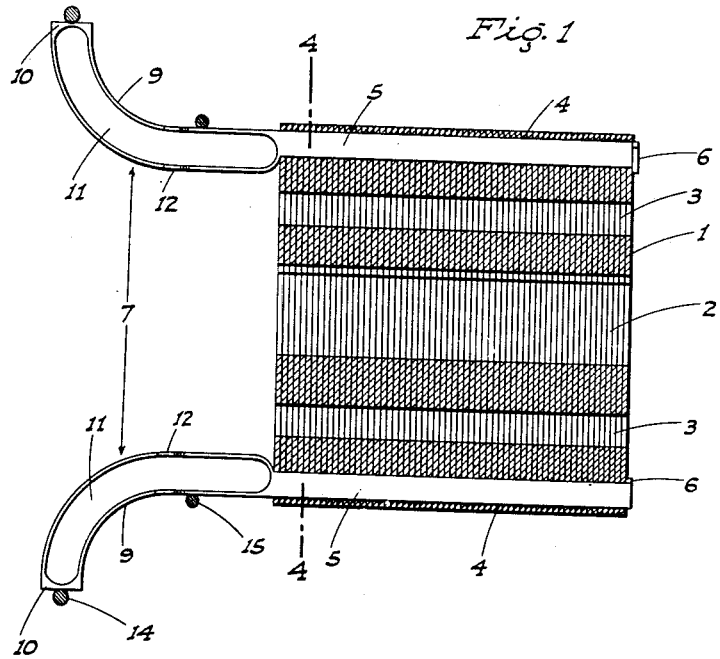
Fig. 1 is a somewhat diagrammatic diametral section of the rotor as embodying the exposed resistance blade assembly.
Figure 2:
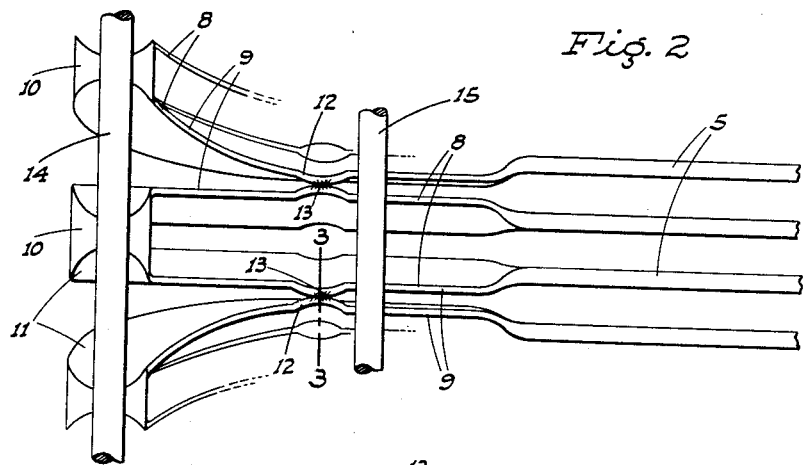
Fig. 2 is an enlarged fragmentary plan view of said resistance blade assembly, detached.
Figure 3:
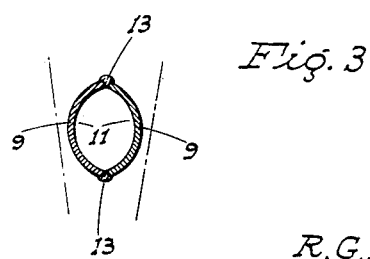
Fig. 3 is a cross section on line 3—3 of Fig. 2.
Figure 4:
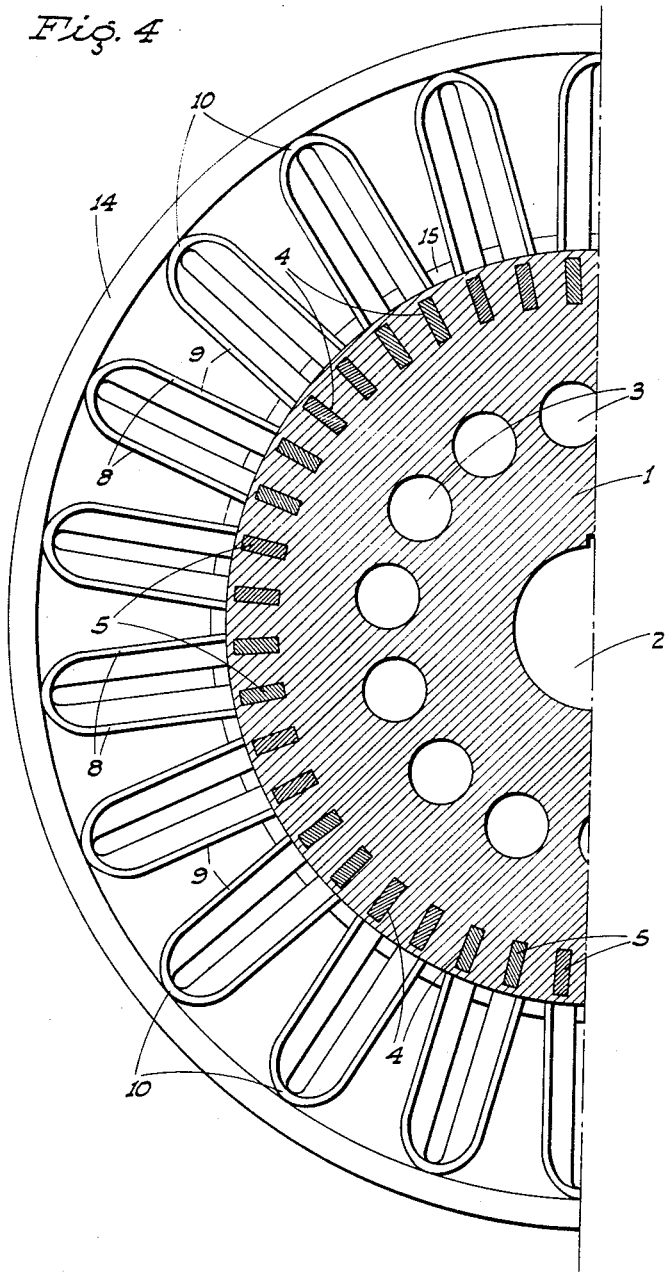
Fig. 4 is an enlarged half cross section on line 4—4 of Fig. 1.

Referring now more particularly to the characters of reference on the drawings, the rotor, indicated at 1, is of laminated or multiple disc type construction, and includes a center bore 2 for the reception of the motor shaft (not shown) in keyed relation. Radially outwardly of the bore 2 the motor 1 includes a plurality of cooling bores 3 extending through said rotor from end to end thereof in circumferentially spaced relation.

Adjacent the periphery of the rotor 1 it is formed with a plurality of longitudinal openings 4 extending from end to end of said rotor and disposed in symmetrical circumferentially spaced relation; such openings 4 having conductor bars 5 extending therethrough in close matching relation. The conductor bars 5 are of copper or other high conductive metal.

At one end the conductor bars 5 project slightly beyond the adjacent end of the rotor 1 and are bent over, as at 6, and brazed together.

At the opposite end the conductor bars 5 are extended as an exposed resistance blade assembly, indicated generally at 7, which is constructed, in detail, as follows:

The conductor bars 5 are paired, as at 8, with the bars of each pair in adjacent relation and engaged in adjacent openings 4 of the rotor 1. The bars 5 of each pair 8 are extended beyond the rotor as integral blades 9 of increased width but somewhat decreased thickness relative to said bars. The resistance blades 9 of each pair 8 of bars 5 extend outwardly from the rotor 1 first in a direction parallel to its axis, and thence turn or curve laterally outwardly so that said blades are of generally L-shape in elevation.

At their outer ends the adjacent resistance blades 9 of each pair 8 of the bars 5 are connected together, in integral relation, by an end loop 10. The resistance blades 9 of each pair 8 of bars 5, as connected by its end loop 10, may be termed a resistance unit, and said resistance units are circumferentially arranged, in symmetrical relation, about the axis of the rotor, with the free or laterally outer end portions of said blades substantially radial to said axis.

Each corresponding pair of the resistance blades 9 are formed by stamping or the like, so that they are concavo-convexo in cross section, with the concave sides 11 outermost, i. e. facing outwardly in opposite directions from the resistance blades of each such resistance unit.

Thus, adjacent faces of corresponding resistance blades 9 are convex and spaced apart for substantially their entire length.

Intermediate their ends the resistance blades 9 corresponding to each pair 8 of the bars 5 are deformed laterally outwardly, as at 12, whereby said deformed portions between the adjacent resistance blades 9 of different but adjacent pairs 8 of the bars 5 abut and are brazed together in electrical contact, as at 13.

When the described rotor is incorporated in an alternating current, induction motor, the induced current in the conductor bars 5 is fed through the resistance blades 9 of the exposed resistance blade assembly 7 connected together in electrical relation in the manner described. In such assembly the resistance, in the blades 9, to the induced current creates heat, which is effectively dissipated from such assembly by the blades upon rotation of the rotor.

The forming of the resistance blades 9 of concavo-convexo configuration in cross section not only imparts rigidity to such blades, but the assembly of the latter as so formed provides a fan which materially increases the rate or speed of dissipation of the heat from the exposed resistance blade assembly 7. Furthermore, such fan tends to create air flow through the bores 3 to further cool the rotor.

As the exposed resistance blade assembly 7 is disposed beyond one end of the rotor, the heat from the induced current can be dissipated, not only without damage to the rotor itself, but also clear of the stator windings (not shown), which extend in the motor about the rotor. The stator windings are thus effectively protected against heat damage.

As the exposed resistance blade assembly 7 becomes relatively highly heated when the motor is in operation, deformation of said assembly is prevented by an outer ring 14 and an inner ring 15 of high resistance metal, such as steel, surrounding said assembly at the end loops 10 and adjacent the brazed points 13, respectively.

Another feature which assists in the heat dissipation is an increase in diameter, with resultant greater lineal speed, of the resistance blade assembly 7 relative to the rotor 1; the dissipation of heat being accomplished much better with this arrangement than would be the case if the resistance blades 9 extended straight, or parallel to the rotor axis, from the conductor bars 5.

As the described exposed resistance blade assembly 7 is formed in unitary relation with the rotor 1, the rotor, together with said assembly, can be removed without any disassembly of said rotor, which is a desirable feature from the standpoint of replacement or repair of the rotor. Additionally, the assembly 7 is of a compact design, permitting of the employment of a compact motor housing, rather than an unduly axially extended housing which would be necessary to enclose the assembly 7 if it comprised solely longitudinally extending resistance blades 9.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. An induction rotor including conductor bars in circumferentially spaced relation and extending to one end of the rotor, and a resistance blade assembly connected in electrical relation to the conductor bars and disposed beyond said one end of the rotor for rotation therewith; said resistance blade assembly including blades extending from the bars lengthwise of the rotor and then bending laterally outwardly whereby to increase the effective diameter of said assembly, each blade being concavo-convexo in cross section to provide rigidity and a fan effect.

2. An induction rotor including conductor bars in circumferentially spaced relation and extending to one end of the rotor, a resistance blade formed on each conductor bar adjacent said end and projecting away from the rotor, the conductor bars and corresponding blades being paired, each pair of blades being electrically connected at their outer ends, and the adjacent blades of different pairs being electrically connected intermediate their ends; each pair of blades extending first lengthwise of the rotor from corresponding bars and then bending laterally outwardly to increase the effective diameter of the assembly of said blades.

3. An induction rotor including conductor bars in circumferentially spaced relation and extending to one end of the rotor, a resistance blade formed on each conductor bar adjacent said end and projecting away from the rotor, the conductor bars and corresponding blades being paired, each pair of blades being electrically connected at their outer ends, and the adjacent blades of different pairs being electrically connected intermediate their ends; each pair of blades extending first lengthwise of the rotor from corresponding bars and then bending laterally outwardly to increase the effective diameter of the assembly of said blades, there being end loops connecting the outer ends of each pair of blades.

4. An induction rotor as in claim 2 in which the blades are concavo-convexo in cross section to provide rigidity and a fan effect.

5. An induction rotor as in claim 2 in which the blades are concavo-convexo in cross section to provide rigidity and a fan effect; the concave sides of the blades of each pair facing in opposite directions.

6. An induction rotor including conductor bars in circumferentially spaced relation and extending to one end of the rotor, a resistance blade formed on each conductor bar adjacent said end and projecting away from the rotor, the conductor bars and corresponding blades being paired, each pair of blades being electrically connected at their outer ends, and the adjacent blades of different pairs having intermediate portions deformed toward each other and electrically connected.

7. An induction rotor including conductor bars in circumferentially spaced relation and extending to one end of the rotor, a resistance blade formed on each conductor bar adjacent said end and projecting away from the rotor, the conductor bars and corresponding blades being paired, each pair of blades extending first lengthwise from the rotor and then bending laterally outwardly substantially radially of the rotor axis to connection at their outer ends, and the adjacent blades of different pairs being electrically connected intermediate their ends.

8. An induction rotor including conductor bars in circumferentially spaced relation and extending to one end of the rotor, a resistance blade formed on each conductor bar adjacent said end and projecting away from the rotor, the conductor bars and corresponding blades being paired, each pair of blades extending first lengthwise from the rotor and then bending laterally outwardly substantially radially of the rotor axis to connection at their outer ends, and the adjacent blades of different pairs having intermediate portions deformed toward each other and electrically connected.

9. An induction rotor including conductor bars in circumferentially spaced relation and extending to one end of the rotor, a resistance blade formed on each conductor bar adjacent said end and projecting away from the rotor, the conductor bars and corresponding blades being paired, each pair of blades extending first lengthwise from the rotor and then bending laterally outwardly substantally radially of the rotor axis to connection at their outer ends, and the adjacent blades of different pairs having intermediate portions deformed toward each other and electrically connected; there being retaining rings surrounding the assembly of said blades adjacent their outer end portions and said intermediate portions.

ROBERT G. LE TOURNEAU.

REFERENCES CITED

The following references are of record in the file of this patent:

UNITED STATES PATENTS

| Number | Name | Date |
|---|---|---|
| 1,685,677 | Maxwell | Sept. 25, 1928 |
| 1,855,073 | Swendsen | Apr. 19, 1932 |
| 2,196,059 | Cox | Apr. 2, 1940 |

FOREIGN PATENTS

| Number | Country | Date |
|---|---|---|
| 555,837 | Germany | Aug. 2, 1932 |